United States Patent

McNeil

[15] 3,693,324
[45] Sept. 26, 1972

[54] FLASH ECONOMIZER FOR VARIABLE LOADS

[72] Inventor: John A. McNeil, 161 Franklin Avenue, Brookville, Pa. 15825

[22] Filed: Feb. 9, 1972

[21] Appl. No.: 224,866

[52] U.S. Cl. ................................................55/191
[51] Int. Cl. ...........................................B01d 19/00
[58] Field of Search.........55/191, 195, 204, DIG. 22, 55/DIG. 23; 122/7, 381, 382, 412; 165/184

[56] References Cited

UNITED STATES PATENTS

| | | | |
|---|---|---|---|
| 1,055,792 | 3/1913 | Plock | 55/435 X |
| 1,560,286 | 11/1925 | Mount | 55/191 X |
| 1,916,528 | 7/1933 | Raymond | 55/435 X |
| 2,762,451 | 9/1956 | McNeil | 55/204 |
| 2,918,139 | 12/1959 | Silverman | 55/449 |
| 3,200,568 | 8/1965 | McNeil | 55/191 |

Primary Examiner—Reuben Friedman
Assistant Examiner—R. W. Burks
Attorney—Green, McCallister & Miller

[57] ABSTRACT

Apparatus is provided for separting out pure flash or dry steam from a blowdown effluent discharge and, at the same time, for recovering a maximum amount of heat from and cooling the liquid content of the effluent to enable directly discharging the liquid into a natural body of water. The apparatus has an elongated main chamber-defining container or vessel provided with a vortex outlet for the steam in its upper area, an intermediate separation area, a heat exchange coil and baffle assembly within a bottom liquid collecting area, and pressure-sensitive trap means connected between lower and intermediate areas within the container for maintaining an effective and efficient operation under variable pressures and flow rates of introduction of the effluent.

15 Claims, 4 Drawing Figures

PATENTED SEP 26 1972   3,693,324
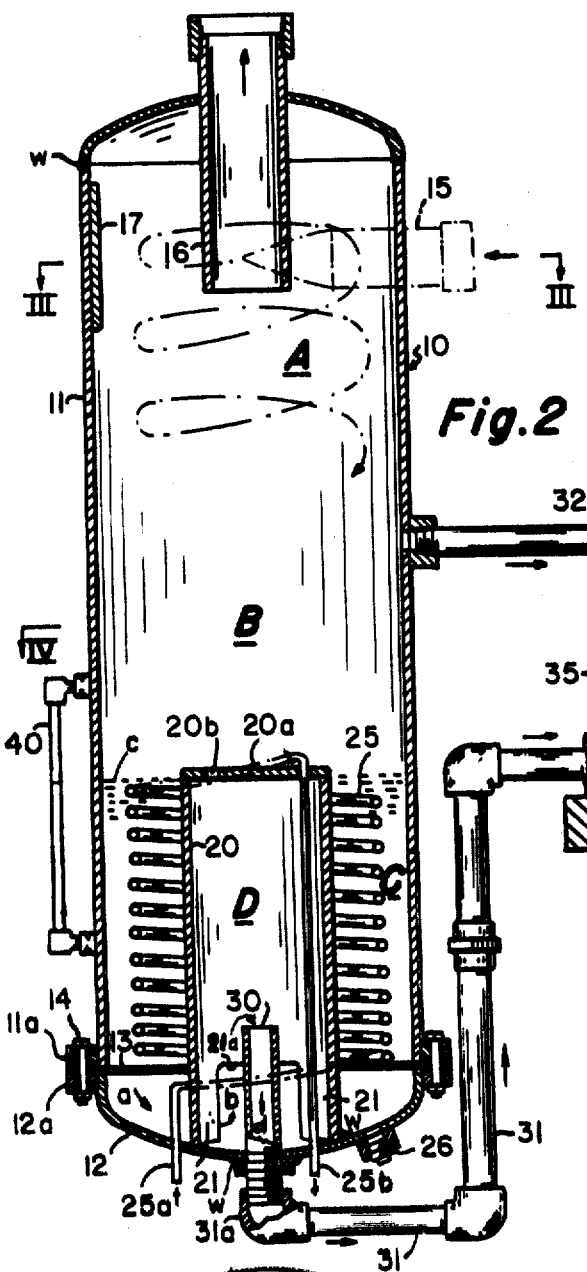
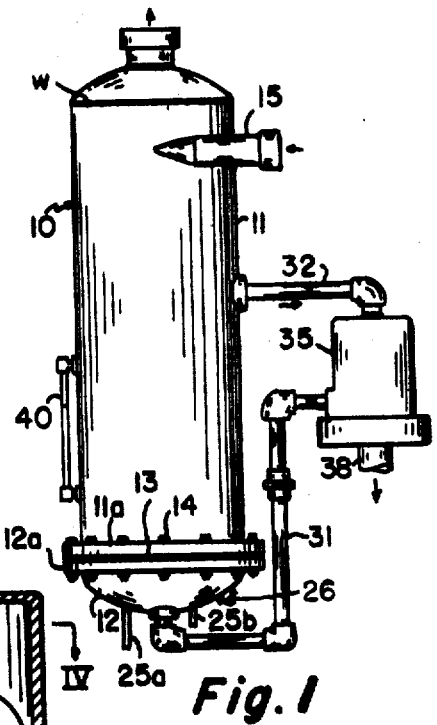
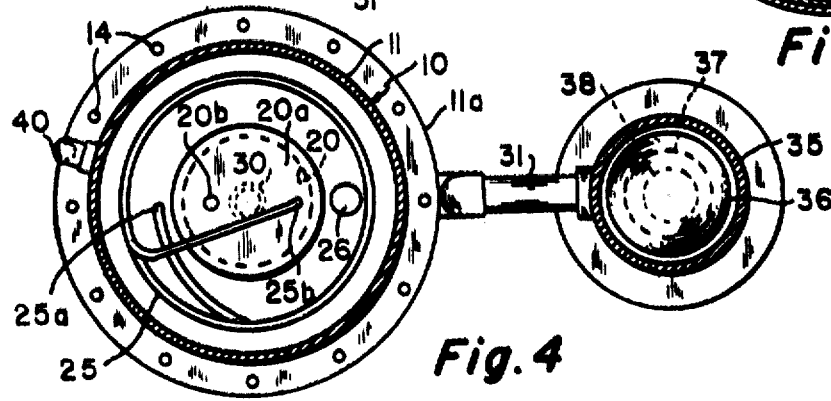

3,693,324

FLASH ECONOMIZER FOR VARIABLE LOADS

CROSS REFERENCE TO RELATED APPLICATIONS

This application deals with a flash separating and liquid cooling economizer apparatus that extends the effective field of utilization of a unitary device to continuous or variable load utilizations, and that constitutes an improvement over the apparatus disclosed in application Ser. No. 95,527, filed Dec. 7, 1970, entitled "Flash Economizer" by Dalph C. McNeil and John A. McNeil.

BACKGROUND OF THE INVENTION

1. Field of the Invention

This invention relates to a flash economizer apparatus for effectively and efficiently reclaiming the heat content of hot blowdown effluent discharged from a pressure vessel or boiler and which enables the recovery of pure flash and a maximum recovery of heat from and a maximum cooling of the water and condensate content of the effluent being introduced.

2. Description of the Prior Art

In a form of apparatus such as disclosed in the above reference application which constitutes an effective unitary apparatus or device for recovering pure steam or flash from the effluent of boiler pressure vessels, etc., while simultaneously removing heat from the liquid content, a problem has arisen where the apparatus is, for example, to be utilized in a continuous operation or particularly where the pressures or rates of flow of the effluent being introduced may widely vary throughout the operating cycle of the apparatus. In such an apparatus, a centrally disposed liquid drain pipe extends upwardly within substantially the full extent of the liquid collecting sector, area or bottom portion of the chamber, receives liquid at its upper end adjacent the liquid level in the sector and a closed upper end of inner baffle means, and is enclosed by one or more vertical baffles. One or more heat collecting tubular heat exchange coil assemblies are positioned about and extend along the baffles and for substantially the full vertical extent of the drain pipe. Although the construction may employ a group of coil assemblies for a maximum of heat transfer from the liquid content of the effluent, it has been discovered that there has been a tendency for the liquid stream that is forced to actively flow along the inside of the baffle before entering the upper open end of the drain or outlet pipe to actually pick up heat from the coils of the heat exchange assembly. Although the apparatus has been highly successful where the effluent is introduced at a substantially constant flow rate, it has been determined that the size of the hole or vent in the top end of the baffle assembly that is open to the open end of the drain pipe had to be enlarged for a greater quantity of effluent to avoid a build-up of back pressure within the innermost chamber portion.

SUMMARY OF THE INVENTION

Increasing the size of the vent opening or hole within the upper end wall of the baffle leading to the innermost chamber portion which constitutes the portion from which the cooled liquid is taken off or discharged, gives rise to a tendency for steam to flow directly from the upper and intermediate portions, areas or sectors of the main chamber therethrough and out the liquid drain, discharge pipe or tubular outlet member. On the other hand, it has been discovered that for most efficient operation, it is desirable to keep or maintain the heat exchange coil assembly or assemblies fully submerged within the liquid being collected in the lower sector or area of the main chamber and to keep the upper end wall of the baffling adjacent to or slightly below the upper surface of the liquid or, in other words, covered with the liquid being collected and discharged from the lower sector. An excessive amount of fluid introduced into the main chamber, or any other condition that will cause an increase of pressure sufficient to lower the water level, will ordinarily cause the coil assembly and portions of the baffling to be exposed to hot steam. This is undesirable.

The above factors have been met in such a manner as to enable the present form of apparatus to be utilized under continuous operating conditions and under conditions such that the quantities or pressure of the effluent being introduced tends to vary considerably. Pressure-sensitive means has been provided to cooperate with the liquid outlet member and the intermediate chamber portion for controlling discharge of cooled liquid portions of the effluent from the bottom chamber portion. The means shown is a float trap or valve unit connected between the intermediate area, sector or chamber portion and the bottom liquid collecting area, sector or chamber portion, and is constructed to assure a balanced pressure relationship such that the baffle means as well as the heat exchange coil assembly will be maintained under a substantially constant level of liquid throughout the full operation.

It has been also established that the best location for the effluent inlet is one in which it is in substantial alignment with a horizontal plane extending along the inner open lip edge of the centrally disposed flash or dry steam tubular outlet or vortex pipe member. This is important from the standpoint of minimizing carryover of moisture with the steam. Finally, it was determined that the liquid outlet discharge or tubular drain pipe member should be of a shortened length such that it does not extend upwardly to the end wall of the baffling or along the full length vertical extent of the coil system. On the other hand, the open end of the liquid drain pipe should only extend within the baffling a short distance, a maximum of about one fourth of the total vertical extent of the interior or secondary chamber defined by a baffling or inner container. This slight extension above bottom edges of the baffling and the coil assembly, avoids any tendency for the coil assembly to reheat the liquid before it is discharged. Where, for example, the dry steam which is being taken off through the top vent or outlet member is either going to the atmosphere through a long run of piping or where it is attached to a pressure vessel such as a deaerator operating at about 5 psig, it is important to balance the pressure in the upper and intermediate areas or portions of the main chamber of the outer vessel or container to maintain the water level at an equilibrium. This is accomplished by means of the side connected float-trap unit.

It has thus been an object of the invention to provide an improved form of economizer that will be practical

BRIEF DESCRIPTION OF THE DRAWINGS

FIG. 1 is a side view in elevation of a flash economizer constructed in accordance with the invention.

FIG. 2 is a greatly enlarged vertical section taken from the same side of and through the apparatus of FIG. 1.

FIGS. 3 and 4 are horizontal sections on the scale of and taken respectively along lines III—III and IV—IV of FIG. 2.

DESCRIPTION OF THE PREFERRED EMBODIMENT

As shown in FIGS. 1 and 2 of the drawings, a flash economizer or charger unit 10 has been provided which has an elongated or longitudinally vertically extending outer vessel or container 11. The outer container 11, as shown particularly in FIGS. 2 and 3, has an enclosing vertical side wall of outwardly convexly curved shape and a pair of opposed outwardly convexly shaped end walls of which 12 denotes a removable bottom end wall part. The bottom end wall part 12 has a flange or rim portion 12a that is adapted to cooperate with a similar rim portion 11a of the main side wall and to be removably secured in position therewith by means of a circular gasket 13 and through-extending bolt and nut assemblies 14.

The walls of the outer container or vessel 11 provide a main enclosed chamber which has an upper flashing chamber portion, area or sector A, an intermediate chamber portion, area or sector B through which hot effluent is passed downwardly in a cyclonic or centrifugal path, and a lower or bottom liquid and condensate collecting and cooling chamber portion, area or sector C. Hot effluent is introduced under pressure tangentially through a substantially horizontally positioned entry or inlet pipe or tubular member 15 into the upper chamber portion or area A in a substantially perpendicular bottom-aligned relation with respect to a centrally upwardly extending and open, flash, dry steam, vortex, discharge pipe or tubular member 16. The effluent thus entering strikes a reinforcing plate member or baffle 17 and moves in a swirling path, as indicated by the dotted lines of FIG. 2, under the impetus of its pressure introduction in such a manner that the lighter portions tend to align with an inner open end portion of the outlet member 16 and the portions of increased heaviness or mass tend to move towards the outer limits of the area within the chamber or, in other words, towards the inside of the side wall of the outer vessel or container 11. The separating action continues through the intermediate area or chamber portion B, with lighter and thus relatively pure steam portions moving upwardly along a substantially central axis of the chamber and out through the vortex outlet pipe or tubular member 16.

On the other hand, the condensate and liquid content of the effluent is collected within the bottom chamber portion C and maintained at a covering level c therein after the start-up of the operation, by both the utilization of a small vent opening 20b, about one-eighth to one-quarter of an inch in diameter has been found to be fully satisfactory, in a substantially horizontally planar upper end wall 20a of an enclosing baffling or inner container 20. As shown, the inner container 20 has side walls of cylindrical shape to conform to the general shape of the outer container wall. The inner container 20 has an open bottom or lower end portion that is supported on the end wall member 12 by a pair of legs 21. As illustrated particularly in FIG. 2, the legs 21 define a pair of opposed, relatively fully open, rectangular-shaped, entry ports or passageways from the bottom portion C of the main chamber into an inner or secondary chamber D that is defined by the enclosing walls of the inner container 20.

A heat exchange tubular coil assembly 25 is positioned within the lower chamber portion C in a substantially equally spaced horizontal position between the side wall of the outer container 11 and the side wall of the auxiliary or inner container 20. Fluid or liquid that is to be heated or employed for picking up heat from the liquid and condensate of the effluent being introduced, flows into the heat exchange coil assembly 25 through an upwardly extending inlet portion 25a. The inlet 25a projects through the bottom head or end wall part 12 and is connected to the lower end of the coil assembly 25. The upper end of the coil assembly 25 is connected to an outlet portion 25b which extends downwardly along the inside of and in a spaced relation with respect to the inner container 20 and out through the bottom end wall part 12.

A temperature gauge 40 is shown mounted on the outside of the wall of the container 11 to extend between the chamber portions B and C, and the bottom end wall part 12 is shown provided with an inspection and sludge removal plug 26. To withstand the in-flow of the effluent within the upper chamber portion A, the baffle plate 17 is preferably of stainless steel. It is provided in the form of a curved sector that is secured within the side wall of the container 11 in a substantially aligned position with the opening of the fluid tube inlet member 15 and may have a horizontal extent of about one quarter of the total inner circumference of the side wall container.

Float trap unit 35 is carried on the outside of the vessel or container 11 and its housing defines a valve receiving chamber that is connected at its upper end through a pipe 32 to the intermediate chamber portion B. A liquid outlet pipe assembly 31 is connected to the chamber of the float trap 35 adjacent its lower end through the agency of a short-length, liquid outlet pipe or tubular member 30 that extends through a sealing collar centrally outwardly of the end wall part 12 from within the secondary chamber D and, as an optimum, only about an inch or two above the open bottom end portion of the inner container 20 or the passageways or ports 21a. The lower threaded end of the liquid outlet pipe 30, is shown connected to the outlet pipe assembly 31 by an elbow 31a.

The float trap unit 35, as shown in FIG. 2, has a valve seat 37 that is concavely rounded to receive a floating ball valve 36. The port through the valve seat 37 extends downwardly through the housing of the unit 35 and delivers or discharges liquid through a discharge fitting 38. The operation of the float trap 35 is such that with a normal quantity of fluid being introduced and a normal pressure within the chamber portion B, the ball 36 will be in an upper or open position to permit cooled liquid or water to flow from the pipe assembly 31 past the seat 37 and out through the fitting 38. On the other hand, when there is a variation representing an increase in quantity of effluent or a pressure build-up within the chamber portion B, this will cause an increased pressure to be exerted on the upper face or area of the ball 36 which is now greater than the pressure exerted by the liquid coming through the piping 31, to thus close the seat 37. Such a condition exists until there is a sufficient depth of water, as represented by the top level c within the lower chamber C, whereby the coil assembly 25 and the auxiliary or baffle 21 are maintained in a covered relation. The gravity pressure exerted by the water in area C exerted through the pipe assembly 31 will then cause the ball 36 to rise off its seat and again permit discharge flow. It is thus apparent that the float trap unit 35 provides a utilization of pressure such as to always maintain a suitable covering level c of liquid within the chamber portion or area C.

In the drawings, w has been used to signify weld metal. The arrows a, b and d show the relatively short and shallow depth path of flow of the cooled liquid into the vertically positioned liquid drain or outlet member 30. The pressure sensitive unit 35, as thus employed, makes possible the employment of a constant size of hole or opening of the vent 20b, e.g., about one-half to three-fourths of an inch in diameter, which will serve to prevent a build-up of back pressure within the secondary chamber D, but which is not sufficiently large to cause a direct blow-through of steam into the liquid discharge or outlet member 30. The unit 30 thus makes possible an automatic adjustment of operation when, for example, the quantity of effluent being introduced or its pressure is greatly increased, momentarily or otherwise. It thus enables the utilization of the apparatus 10 for continuous operations and for any special needs that may arise. It will be noted from FIGS. 1 and 2 that the pressure control unit 35 is carried at an elevated position that substantially represents the level c of liquid within the bottom chamber portion C. The liquid content of the effluent as cooled and reduced in pressure is shown as entering the side of the chamber of the unit 35 at substantially the normal or desired level c of liquid within the chamber portion C. However, the port of valve seat 37 is shown positioned below such liquid level.

It will be appreciated that the single helical coil assembly 25 is merely representative and that a double or triple assembly or system may be employed, in order to lower the temperature of the liquid portion of the effluent down to a suitable value. For example, single coil assembly may be used to lower the liquid outlet temperature to about 140° F., and a dual or double coil assembly may be used to lower it to about 110° F. In this connection, the length of the coil system or assembly will govern whether a single or a plurality of coil helixes are used. However, as applied to the present invention, an assembly using a plurality of coils will be positioned within the same general area as the single coil assembly 25, and will be located below the surface level c of the liquid within the bottom chamber portion C. Where a plurality of series-connected coils are to be employed, they may be positioned in an open relationship with respect to each other along the bottom chamber portion C or, as shown in FIGS. 4 and 5 of the above-mentioned application Ser. No. 95,527, may be separated by baffle or container walls.

I claim:

1. In a flash economizer suitable for operation under variable load conditions for flash separation of pure steam from condensate and liquid of a contaminated blow-down discharge of effluent being introduced under positive pressure, a longitudinally extending outer container having opposed top and bottom end walls and a side wall defining a vertically elongated main chamber therewithin, a side-positioned inwardly extending effluent-introducing tubular inlet member open into an upper flashing chamber portion of the main chamber, a centrally disposed tubular outlet member for pure steam extending downwardly through said top end wall of said outer container into the flashing chamber portion and having an inner open end portion in a cooperating aligned relation with respect to said effluent inlet member, a bottom chamber portion open through an intermediate chamber portion to the upper chamber portion, an inner container positioned within said bottom chamber portion in an upwardly extending and transversely inwardly spaced relation with respect to said side wall of said outer container, said inner container having a lower open end portion to receive liquid from the bottom chamber portion and having a top end wall and a side wall defining a secondary chamber within the main chamber, means mounting said inner container with its lower open end portion in an upwardly spaced relation with respect to the bottom chamber portion of said outer container to provide for liquid flow from the bottom chamber portion through said open bottom end portion of said inner container into said secondary chamber, a heat exchange coil assembly mounted within the bottom chamber portion in a spaced-apart relation between the side walls of said inner and outer containers, means for circulating cooling fluid through said coil assembly for removing heat from liquid collected from the effluent within the bottom chamber portion, said inner container having a vent opening in its said top end wall for equalizing pressure under normal operating conditions between the intermediate chamber portion and the secondary chamber, a tubular liquid outlet member extending from the secondary chamber through said outer container to remove cooled liquid from the main chamber, and pressure-sensitive means connected between the intermediate chamber and the bottom chamber portion and cooperating with the vent opening to maintain a level of liquid within said bottom chamber portion under steady and variable load conditions that covers said heat exchange coil assembly adjacent said top end wall of said inner container.

2. In a flash economizer as defined in claim 1, said top and bottom end walls and said side wall of said outer container and said side wall of said inner container being of outwardly substantially convexly rounded shape, and said top end wall of said inner container being of substantially planar shape.

3. In a flash economizer as defined in claim 1, said tubular liquid outlet member extending upwardly through said bottom end wall of said outer container into the open bottom end portion of said inner container, and said pressure-sensitive means having a liquid outlet fitting and having inlet ports connected between the intermediate chamber portion and said liquid outlet member to control discharge of cooled liquid from the bottom chamber portion of said outer container.

4. In a flash economizer as defined in claim 3, said liquid outlet member extending within said inner container a maximum distance of about one-fourth of the depth of the secondary chamber thereof.

5. In a flash economizer as defined in claim 3, said pressure-sensitive means having a housing defining an operating chamber therein, having a valve seat open downwardly from said control chamber to said liquid outlet fitting, and having a ball valve operatively positioned within said control chamber and cooperating with said valve seat for movement between and open position with respect to said valve seat under normal operating conditions to bypass liquid from said liquid outlet member to said liquid outlet fitting and to close off liquid flow therebetween when a pressure is exerted on said ball valve within said control chamber that is excessive with respect to pressure exerted on said ball valve by cooled liquid within said outer chamber.

6. In a flash economizer as defined in claim 3, said mounting means for said inner container having leg means extending downwardly from said open lower end portion of said inner container and secured to said bottom end wall of said outer container to position said inner container in a centrally disposed relation within said outer container.

7. In a flash economizer as defined in claim 6, said liquid outlet member extending upwardly between said leg means and within said inner container a maximum of about one-fourth of the depth of the secondary chamber between said top end wall thereof and bottom edges of said open lower end portion thereof.

8. In a flash economizer as defined in claim 7, said effluent inlet member having a tangential mounting on said side wall of said outer container, and having an inner open end portion extending through said side wall on a substantially horizontal plane that is above and in substantial alignment with a horizontal plane taken along edges of said inner open end portion of said steam outlet member.

9. In a flash economizer as defined in claim 4, said heat exchange coil assembly being mounted on and extending in a horizontally spaced relation along said inner container within the bottom chamber portion of said outer container and terminating adjacent said open lower end portion of said inner container, a cooling fluid inlet extending through said bottom end wall of said outer container and connected to a lower end of said coil assembly, a fluid outlet extending through said bottom end wall of said outer container upwardly along and within said inner container and being connected to the upper end of said coil assembly, and said fluid inlet and outlet being adapted to circulate a cooling fluid through said coil assembly for removing heat from the liquid within the bottom chamber portion of said outer container.

10. In a flash economizer suitable for operation under variable load conditions for flash separation of pure steam from condensate and liquid of a contaminated blow-down discharge of effluent being introduced under positive pressure, a longitudinally extending outer container having opposed top and bottom end walls and a side wall defining a vertically elongated main chamber therewithin, a side-positioned inwardly extending effluent-introducing tubular inlet member open into an upper flashing chamber portion of the main chamber within said container, a centrally disposed tubular outlet member for pure steam extending downwardly through said top end wall and having an inner open end portion in a cooperating aligned relation with respect to said effluent inlet member within the upper flashing chamber portion, a bottom chamber portion substantially fully open through an intermediate chamber portion to said upper chamber portion to constitute the main chamber, an inner container positioned within the bottom chamber portion in an upwardly extending and transversely inwardly spaced relation with respect to the side wall of said outer container, said inner container having an open bottom end portion to receive liquid from the bottom chamber portion and having a top wall and a side wall defining a secondary chamber within the main chamber, said inner container being mounted within said outer container with its said open bottom end portion in an upwardly spaced relation with respect to the bottom end wall of said outer container to bypass liquid from the bottom chamber portion into the secondary chamber, a tubular liquid outlet member extending into the secondary chamber adjacent said open bottom end portion of said inner container for receiving and discharging cooled liquid from the bottom chamber portion of said outer container, a heat exchange coil assembly mounted within the bottom chamber portion in a spaced-apart relation between the side walls of said inner and outer containers and adapted to circulate a heat removing fluid therethrough for cooling liquid collected from the effluent within the bottom chamber portion; and pressure-sensitive means cooperating with said liquid outlet member, the intermediate chamber portion and said inner container for controlling discharge of cooled liquid from the bottom chamber portion of said outer container through the secondary chamber.

11. In a flash economizer as defined in claim 10, said tubular liquid outlet member extending within the secondary chamber and a maximum of about one fourth of the total vertical extent thereof within said inner container.

12. In a flash economizer as defined in claim 11, said pressure-sensitive means having a pressure-sensitive valve operative to maintain a desired level of liquid from the effluent within the bottom chamber portion of said outer container.

13. In a flash economizer as defined in claim 10, said pressure-sensitive means being connected at one end to said intermediate chamber and at its other end to receive cooled liquid from said liquid outlet member, and said pressure-sensitive means having a valve that is normally open to discharge cooled liquid when pressure within the intermediate chamber portion is normal and to close off discharge flow of the cooled liquid when pressure within said intermediate chamber is above normal and until pressure exerted by the cooled liquid within the bottom chamber portion of said outer container substantially balances the above normal pressure within the intermediate chamber portion.

14. In a flash economizer as defined in claim 13, said pressure-sensitive means being carried at an elevated position that substantially represents the level of liquid within the bottom chamber portion of said outer container.

15. In a flash economizer as defined in claim 13, said pressure-sensitive means comprising a float trap unit having a float valve member therein that is operatively positioned for retention in an open liquid outflow position when pressure within the intermediate chamber portion of said outer container is normal and to close off discharge of cooled liquid when pressure in the intermediate chamber portion is above normal and is exerting a surface-depressing action on the liquid level within the bottom chamber portion.

* * * * *